United States Patent [19]
Godkin et al.

[11] Patent Number: 4,611,139
[45] Date of Patent: Sep. 9, 1986

[54] AXIAL AIR GAP BRUSHLESS ALTERNATOR

[75] Inventors: Mikhail Godkin, Chicago; Kevin S. Moran, Algonquin, both of Ill.

[73] Assignee: Motorola, Inc., Schaumburg, Ill.

[21] Appl. No.: 753,368

[22] Filed: Jul. 8, 1985

Related U.S. Application Data

[63] Continuation of Ser. No. 426,571, Sep. 29, 1982, abandoned.

[51] Int. Cl.$^4$ ............................................. H02K 1/22
[52] U.S. Cl. ...................................... 310/266; 310/90; 310/105; 310/168; 310/263
[58] Field of Search .................. 310/102 R, 103, 104, 310/105, 93, 96, 90, 263, 168, 266; 322/59

[56] References Cited

U.S. PATENT DOCUMENTS

| | | | |
|---|---|---|---|
| 2,928,963 | 3/1960 | Bertsche | 310/168 |
| 3,469,123 | 9/1969 | Inaba et al. | 310/49 |
| 3,484,635 | 12/1969 | MacKallor, Jr. | 310/266 |
| 3,534,204 | 10/1970 | Groezinger | 310/168 |
| 3,548,226 | 12/1970 | Sato | 310/68 R |
| 3,569,804 | 3/1971 | Studer | 310/168 |
| 3,610,979 | 10/1971 | Thomas | 310/263 |
| 3,614,593 | 10/1971 | Lace | 310/68 R |
| 3,617,857 | 11/1971 | Gunderson | 322/28 |
| 3,629,689 | 12/1971 | Riff | 322/28 |
| 4,087,713 | 5/1978 | Binder | 310/68 R |
| 4,201,930 | 5/1980 | Inagaki et al. | 310/263 |
| 4,228,384 | 10/1980 | Arnold, Jr. et al. | 310/268 |
| 4,297,604 | 10/1981 | Tawse | 310/268 |
| 4,358,695 | 11/1982 | MacDonald | 310/105 |
| 4,379,242 | 4/1983 | MacDonald | 310/105 |
| 4,410,819 | 10/1983 | Kobayashi | 310/105 |
| 4,421,998 | 12/1983 | Ahner | 310/263 UR |
| 4,423,344 | 12/1983 | Jones | 310/105 |

FOREIGN PATENT DOCUMENTS

| | | |
|---|---|---|
| 1121716 | 1/1962 | Fed. Rep. of Germany . |
| 2846224 | 5/1980 | Fed. Rep. of Germany ...... 310/263 |
| 1469058 | 2/1967 | France . |
| 2516340 | 5/1983 | France . |
| 452677 | 5/1968 | Switzerland . |
| 0460146 | 9/1968 | Switzerland ........................ 310/263 |

OTHER PUBLICATIONS

Robert Bosch N3 Alternator Advertising Sheet, 1979.

Primary Examiner—R. Skudy
Attorney, Agent, or Firm—Phillip H. Melamed

[57] ABSTRACT

A brushless alternator is disclosed having a stationary field coil and core surrounded by a stationary stator coil and core with a cylindrical air gap being defined therebetween. A rotor assembly is fixed to a rotatable shaft and has interweaved separate magnetic finger assemblies joined together by a non-magnetic ring wherein these fingers are rotated in the cylindrical gap. The stator and field cores are radially disposed with respect to the rotatable shaft. The field core axially extends beyond the effective axial length of the field coil and provides at an axial position beyond the effective axial length of the field coil, at least one low reluctance axial flux gap between the field core and the magnetic fingers. This flux gap conducts a substantial portion of the flux created by the field coil. The field core also serves as a shaft bearing retainer and has a bearing grease reservoir comprising a cylindrical recess adjacent the shaft bearing.

24 Claims, 6 Drawing Figures

AXIAL AIR GAP BRUSHLESS ALTERNATOR

This is a continuation of application Ser. No. 426,571, filed Sept. 29, 1982, now abandoned.

BACKGROUND OF THE INVENTION

The present invention generally relates to the field of brushless alternators and more particularly to brushless alternators which comprise stationary field and stator assemblies having an air gap therebetween which is radial with respect to the axis of rotation of a drive shaft that rotates magnetic fingers in the radial air gap to vary the magnetic coupling between the stator and rotor assemblies.

Brushless alternators are distinct from brush type alternators in that brush type alternators require stationary electrical contacts (brushes) fixed to the housing to provide a continuous connection to a rotating electrical assembly. Typically the rotating assembly comprises a rotating magnetic field coil assembly of the alternator, and the continuous electrical connection is provided by a friction contact to a rotating slip ring. In brushless alternators, the configuration of the alternator is such that there is no need to provide an electrical connection between stationary electrical contacts and rotating electrical assemblies.

Two general types of brushless alternators exist. In one such type a rotating magnetic field assembly is provided and it receives electrical energization from a stationary energy source, but this is not provided by a physical electrical connection to the energy source provided by brushes, but by magnetic coupling to the source which is accomplished through the utilization of an electrical transformer type structure. An alternator of this type is illustrated in U.S. Pat. No. 3,614,593, and voltage regulators for alternators of this type are illustrated in U.S. Pat. Nos. 3,617,857 and 3,629,689, all of these patents assigned to the same assignee as the present invention.

The present invention does not deal with alternators having a rotating field coil assembly, but instead deals with brushless alternators having stationary both stator and field coil assemblies but providing rotated magnetic fingers which vary the magnetic coupling between the field and stator assemblies. The fingers are rotated about a shaft axis and pass through a radial cylindrical air gap located between the stator and field coil assemblies. In such brushless alternator assemblies which have been previously provided, typically the configuration of these alternators has not been optimized to provide a maximum output current for a fixed amount of alternator volume. In other words the volumetric efficiency of such prior brushless alternators has not been substantial. In addition, such prior brushless alternators typically require a substantial number of relatively costly magnetic circuit elements and/or they undesirably extend either the axial length or the diameter dimensions of the alternator due to their structural configuration. Also, the configuration of these prior brushless alternators typically limits the amount of volume internal to the alternator which can be used for grease reservoirs for the rotatable shaft bearings, since if a larger grease reservoir were provided for insuring a longer lifetime of the alternator bearings either the size of the alternator would be undesirably increased or the electrical performance of the alternator would be decreased by the removal of a substantial amount of magnetic circuit material in critical magnetic circuit areas.

In summary, prior brushless alternators utilizing stationary field and stator assemblies; (1) did not provide high volumetric efficiencies, (2) did not implement a compact form factor (axial length versus diameter) for the alternator due to their configuration, (3) typically required a large number of magnetic circuit members, (4) were costly due to the use of additional magnetic circuit members, and (5) did not readily permit the utilization of large alternator shaft bearing grease reservoirs without either compromising the electrical output of the alternator or undesirably increasing the alternator dimensions.

The term "flux air gap" as used herein refers to an air space between magnetic circuit components across which a substantial magnetic flux passes due to the relatively low reluctance of this air gap as compared to other air gaps therebetween wherein the reluctance of the gap is a function of the air spacing between the magnetic circuit components and the surface areas of these components which face each other across the air gap. The term "primary" flux air gap as used herein refers to the flux gap between the stationary stator core and rotated magnetic circuit members, while the term "secondary" flux air gap refers to the flux air gap between the stationary field core and rotated magnetic circuit members. The terms "axial" and "radial" as used herein refer to structural orientations with respect to the axis of rotation of the rotor which coincides with the rotational axis of the alternator shaft.

Typically, prior art brushless alternators having stationary field coil and stator assemblies have two primary cylindrical radial flux air gaps between the stator and magnetic fingers which are rotated in a cylindrical radial gap between the field and stator cores by a shaft. These primary flux air gaps are axially spaced apart, but adjacent to each other and located in the radial gap between the stator and field assemblies at substantially the same radial position with respect to the shaft. Typically these alternators utilize two secondary radial flux air gaps between the field coil core and extensions of the rotated magnetic fingers.

In some alternators of the preceding type at least one of these secondary radial flux air gaps is positioned radially spaced apart from the cylindrical gap between the field and stator assemblies and positioned axially with respect to the rotatable shaft in substantially the same, axial position as the primary radial flux air gaps thus leading to an undesirable increase in the alternator diameter due to the radial stacking of the primary and secondary flux gaps.

Some prior art brushless alternators of the preceding description which utilize two radial primary and two radial secondary flux air gaps position both of the secondary flux air gaps axially apart with respect to the shaft axis and axially spaced on each side the primary flux gaps. However, this configuration leads to a substantial increase in the axial length of the alternator along the rotated shaft axis, and this is also undesirable.

In one known prior brushless alternator configuration utilizing stationary field and stator coil assemblies, a hybrid axial and radial flux air gap is provided for one secondary flux air gap by a diagonal extension (as viewed in a cross section of the alternator along the shaft axis) of the field coil core forming a diagonal flux air gap with a mating diagonal extension of a magnetic member coupled to the rotating magnetic fingers. However, in this configuration the diagonal flux gap is provided in the same axial position as the primary flux gaps and the stationary field coil thus requiring a substantial increase in the diameter of the alternator to insure that magnetic saturation does not occur either in the diagonal extension of the field core or in the corresponding diagonally magnetic finger extension which mates with the field core diagonal extension. Due to the location of the diagonal flux gap, a relatively high reluctance flux gap is provided since only a relatively small cross sectional area is available for this gap.

The diagonal gap configuration discussed above apparently does not appreciate that its configuration can lead to saturation of its magnetic circuit elements which will inherently limit the output of the alternator. This also appears to be the case with other brushless alternator configurations with provide designs wherein the field core can be saturated at low alternator output levels. Also, the diagonal gap configuration provides a shaft bearing which is also axially positioned along the shaft axis in the same axial position as the diagonal flux gap and the field coil. This configuration, if the size of the alternator is not to be increased, requires a further reduction in the size of the diagonal field core extension which conducts flux, thus causing magnetic saturation of this element at even lower ampere turns of the field coil. This will limit the alternator output. This is caused by the effective radial stacking of the bearing, the field core diagonal extension, the magnetic finger diagonal extension, the field coil and the primary flux air gap, all of which are located in substantially the same axial position.

SUMMARY OF THE INVENTION

An object of the present invention is to provide an improved brushless alternator which overcomes the above mentioned deficiencies of prior brushless alternator configurations.

A more particular object of the present invention is to provide an improved brushless alternator having stationary field and stator assemblies with the magnetic coupling therebetween being provided by rotatable magnetic fingers wherein an improved volumetric efficiency and compact form factor of the alternator is obtained such that a maximum alternator output current is provided for a fixed amount of alternator volume.

An additional object of the present invention is to provide such a brushless alternator which has at least one axial low reluctance flux air gap between at least one of the stationary field and stator assemblies and the rotating magnetic fingers wherein this axial flux gap is provided axially beyond the effective axial length of the field coil thereby minimizing the alternator diameter dimension while only marginally increasing the axial dimension of of the alternator.

In one embodiment of the present invention an alternating current generator (alternator) is provided comprising: an alternator outer housing; a rotatable shaft having a longitudinal axis, said shaft extending longitudinally within said housing and rotatable with respect to said housing about said axis; a stator assembly having a magnetic stator core with a stator coil wound thereon defining an effective axial stator coil length along said shaft axis, said stator core being located within and fixed with respect to said housing; a field assembly having a magnetic field core with a field coil wound thereon defining an effective axial field coil length along said shaft axis, said field core being located within and fixed with respect to said housing; said stator coil and core radially spaced apart from said field coil and core with respect to said shaft axis thereby defining a cylindrical radial air gap therebetween; at least one of said stator and field magnetic cores having a core end portion axially extending beyond the effective length of the coil wound thereon; a rotor assembly fixed to and rotatable with said shaft and including at least a first magnetic claw pole member fixed to said shaft and having magnetic fingers extending into said cylindrical radial gap and forming a low reluctance radial flux air gap between said claw pole member fingers and at least one of said stator and field magnetic cores; wherein the improvement comprises, said first claw pole member having magnetic portions that radially extend with respect to said shaft axis and form a low reluctance axial flux air gap with a radially extending end surface of said axially extending core end portion at a position axially beyond the effective axial length of the coil wound on the core having said axially extending core end portion, wherein said axial flux air gap provides a low reluctance magnetic path for conducting a substantial portion of flux created by said field coil in said field core.

The present invention contemplates having a substantially cylindrical stationary inner field coil assembly comprising the field coil and its associated magnetic core, a stationary outer stator assembly comprising the stator coil and its associated core, and rotatable magnetic fingers which are driven by a shaft rotated about an axis and which provide a variable magnetic field in a cylindrical air gap present between the stationary field and stator assemblies. The present invention is primarily directed to the use of an axial flux air gap as a secondary flux gap between the field core and the rotating magnetic fingers, with the axial flux gap being positioned axially along the shaft axis beyond the effective axial length of the field coil wherein the axial flux air gap has a low reluctance and conducts at least a substantial amount of the flux created by the field coil. An additional secondary flux gap is also provided between the field core and a pole extension of the rotor having separate rotated pole extension magnetic fingers interweaved with the claw pole magnetic fingers. This additional flux gap, which in some embodiments is axial, radial or a combination of both, is also axially spaced beyond the effective axial length of the field coil. This configuration has been found to improve the volumetric efficiency of brushless alternators utilizing stationary field and stator assemblies. This is primarily attributable to the present invention using a radially extending portion of an end portion of the field core to form an axial flux air gap axially spaced beyond the effective axial length of the field coil and therefore providing enough space within the alternator to provide a substantial radial thickness of field core material between the field coil and the rotating shaft which is contemplated as comprising inexpensive non-magnetic material. By increasing the radial dimension of the field core, the present invention effectively prevents saturation of the field core by magnetic flux and therefore permits the alternator to obtain its maximum possible output current.

Another aspect of the present invention is that it provides a brushless alternator with fewer rotating magnetic parts than some prior similar brushless alternators thus providing an easier to assemble and less costly alternator. Additionally the present design reduces rotating inertia thus providing for improved mechanical reliability. This is because in some prior brushless alternators utilizing stationary field and stator assemblies, typically one of the secondary flux air gaps were formed by either having the rotating shaft made of magnetic material, or having a magnetic projection of the rotating fingers disposed between the field core and the rotatable shaft with this projection being rotated with the rotatable shaft. Each of these configurations increased the expense of the alternator and also increased the number of magnetic circuit components. These prior configurations, while increasing the number of rotatable magnetic circuit components, also reduce the amount of volume available for the field core unless the diameter of the alternator is made larger. The present invention eliminates these undesirable characteristics by spacing the secondary flux air gaps axially beyond the effective axial length of the field coil and providing at least one of these flux gaps as an axial flux gap which utilizes a radial extension of the field core to avoid any substantial increase in the alternator dimensions.

An additional aspect of the present invention concerns the utilization of the field core as a bearing retainer for the rotatable shaft bearings, thus eliminating the requirement for a separate alternator bearing retainer. In addition, a cylindrical recess is provided in the field core at an axial position adjacent to the retained bearing and axially spaced beyond the effective axial length of the field coil. This provides a substantial grease reservoir for the bearing without reducing the thickness of the field core in the critical location along the effective axial length of the field coil. By providing an increased bearing grease reservoir the lifetime of alternators constructed in accordance with the present invention is substantially increased.

While the drawings of the present invention illustrate one or more secondary axial flux gaps being provided with respect to an inner field core, it should be noted that the present invention could also be applied to providing axial flux gaps with respect to the outer stator core and also reversing the inner and outer positions of the field and stator cores with respect to the rotatable shaft. These features, as well as others, can best be understood by refering to the drawings and subsequent description of the preferred embodiments of the present invention.

BRIEF DESCRIPTION OF THE DRAWINGS

For a more complete understanding of the present invention references should be made to the drawings, in which.

DESCRIPTION OF THE PREFERRED EMBODIMENTS

Figure 1:
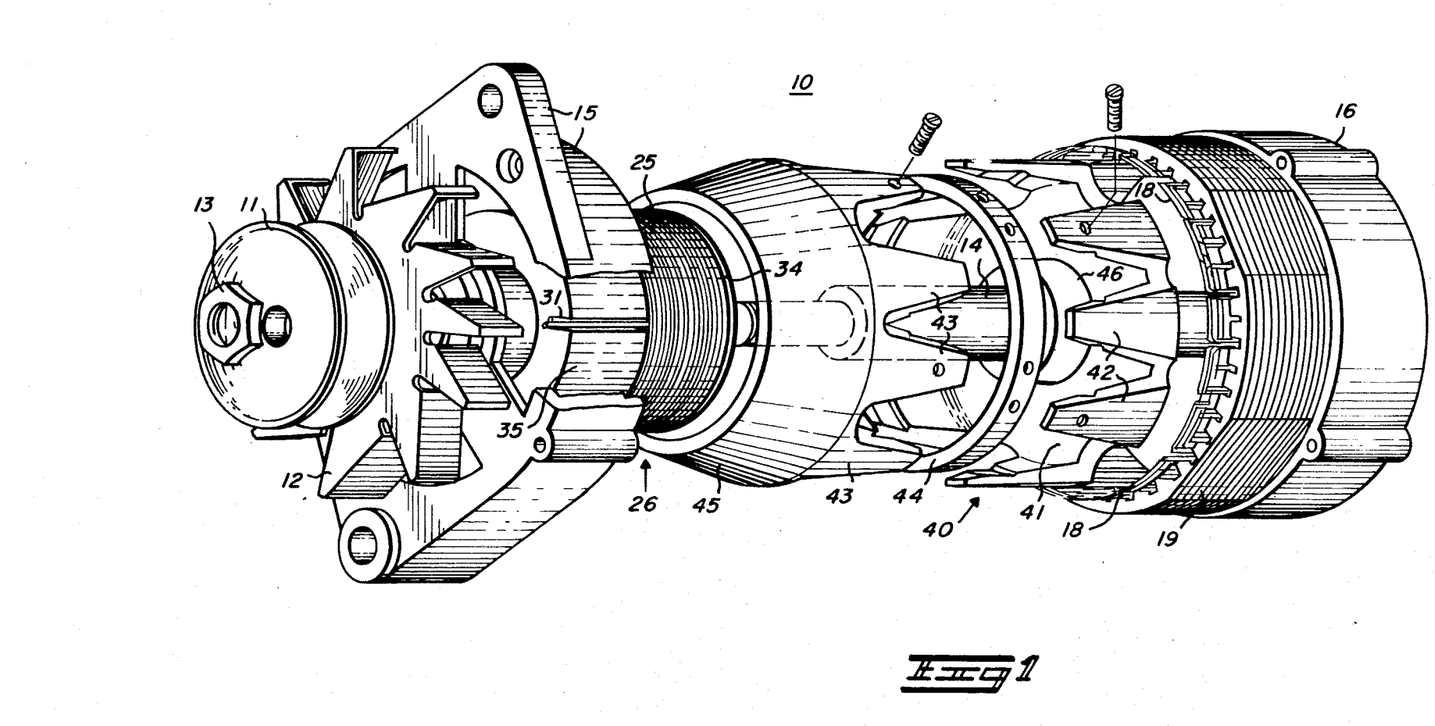
FIG. 1 is an exploded assembly view of an alternator contructed in accordance with the present invention.
Figure 2:
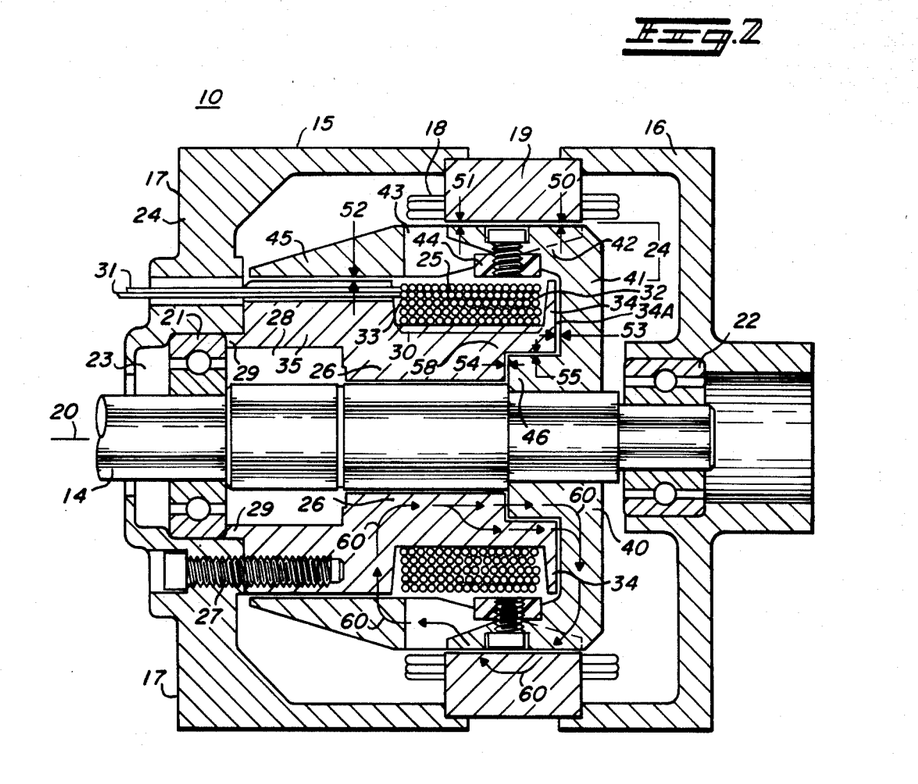
FIG. 2 is a cross sectional view of a preferred embodiment of the assembled alternator shown in FIG. 1.

FIG. 1 illustrates an exploded assembly view of an altenator 10 constructed in accordance with the teachings of the present invention, while FIG. 2 is a cross sectional view of the assembled alternator 10. FIGS. 1 and 2 illustrate a primary embodiment of the present invention and this embodiment will be discussed first.

Subsequently the additional embodiments illustrated in FIGS. 3-6 will be discussed.

The alternator 10 comprises many conventional alternator components such as a belt drivable end-pulley 11 and a rotatable fan assembly 12 intended for attachment, by a retaining nut 13, to a rotatable shaft 14 of the alternator. FIG. 2 is a cross section of the alternator 10 taken along the axis of rotation of the shaft 14, but the shaft 14 is not shown cross hatched to maintain the clarity of the Figure. The alternator 10 also comprises an outer alternator housing for the internal structure of the alternator. The alternator housing comprises a first end member 15 which mates with a second end member 16, the alternator shaft 14 protruding through an end wall 17 of the alternator housing end member 15 and connecting to the pulley 11 and fan assembly 12 located exterior to the alternator housing 15. A portion of the end member 15 in FIG. 1 has been removed to show additional detail of other alternator components.

The housing end members 15 and 16 will be bolted together by suitable mounting apparatus. A stator assembly is provided within the housing and comprises a stator coil 18 which is wound on a magnetic stator core 19. The stator core 19 is fixed to the alternator housing by being clamped between the end members 15 and 16 each of which is generally bell shaped in configuration. Thus the stator assembly is fixed with respect to the housing.

The stator assembly comprising the coil 18 and core 19 is stationary with respect to the rotatable shaft 14 which preferably comprises an inexpensive non-magnetic metallic material. The shaft 14 has a longitudinal axis 20 and extends longitudinally within the housing formed by the end members 15 and 16 and is rotatable with respect to the housing about the axis 20. Shaft bearings are provided in each of the housing end members 15 and 16 for support of the shaft 14. The bearing in the housing end member 15 is designated by the reference numeral 21 and the bearing in the housing end member 16 is designated by the reference numeral 22. The configuration of the bearings 21 and 22 is conventional with bearing 22 being fixed to the housing end member 16 and bearing 21 being retained in a recessed cavity 23 in the wall 17 of the housing end member 15. The manner in which the bearing 21 is retained in the housing wall cavity 23 will be discussed subsequently.

The alternator 10 includes a stationary field coil assembly comprising a field coil 25 wound on a magnetic material field core 26 which is fixed to the alternator housing wall 17 by mounting means comprising threaded bolts 27. This insures that the field assembly comprising the coil 25 and core 26 is stationary with respect to the rotatable shaft 14. The field coil and field magnetic core are adjacent to and substantially surround the rotatable shaft 14 forming an inner cylindrical assembly thereabout. The stator coil 18 and stator magnetic core 19 are also cylindrically disposed about the rotatable shaft 14 and form an outer cylindrical assembly which is radially spaced further apart from the shaft 14 thereby defining a cylindrical radial air gap 24 between the field and stator assemblies. It is contemplated that flux from the field core 26 passes to the stator core 19 through a primary radial flux air gap located in the cylindrical gap 24 between the stator and field assemblies.

The field core 26 has a cylindrical recess 28 formed at one axial end thereof which is adjacent to the bearing 21 in the housing wall 17. Projecting end portions 29 of the field core 26 contact the bearing 21 thus having the core 26 serve as bearing retainer apparatus while the cylindrical recess 28 is filled with bearing grease thereby using the recess 28 as a grease reservoir for the bearing 21. The recess 28 is adjacent to the rotatable shaft and is axially positioned beyond the effective axial length of the field coil 25 such that providing the recess 28 does not reduce the portion of the field core 26 upon which the field coil 25 is wound. The term "effective axial length of the field coil", as used herein, refers to the total axial length of relatively closely spaced turns of the coil 25 which are wound on the core 26 and provide therein a zone of high flux concentration along this axial dimension. This term ignores the axial length of any input leads for the coil 25 which do not comprise close turn windings. A similar definition applies to the effective axial length of the stator coil.

It should be noted that the field core 26 is essentially cylindrical in shape and is oriented with its longitudinal axis coincident with the shaft axis 20. The core 26 has a bobbin type shape with a reduced outer diameter section 30 upon which the field core winding 25 is directly wound. The reduced diameter section 30 is axially positioned between larger outer diameter portions of the field core 26 and the axial dimension of the section 30 essentially corresponds to the effective axial length of the field coil 25. The core 26 is positioned directly adjacent the shaft 14 along a majority of the effective axial length of the coil 25.

Input excitation leads 31 for the field core 25 pass through appropriate channel openings in the housing wall 17 and field core 26 and apply excitation potential to the coil 25. While not shown, it is contemplated that the leads 31 connect to terminals exterior to the alternator housing. The field coil 25 essentially has an effective electrical axial length along the reduced diameter portion 30 of the core 26 since it is along this axial length of the field coil that the majority of the magnetic flux provided by the field coil will be generated due to close winding of the coil 25 in this area. Thus the field coil 25 can essentially be considered to comprise a cylindrical coil winding having a first end 32 and a second end 33 at opposite ends of the portion 30. The field core 26 has an axial cylindrical end extension 34 of the field core 26 which extends beyond the end 32 of the field coil and therefore beyond the effective axial electrical length of the coil 25. This axial extension 34 has an end surface 34A which extends radially with respect to the shaft 14. The extension 34 forms the larger outer diameter portion of the core 26 at one end of the reduced diameter section 30.

The alternator 10 includes a rotor assembly which is fixed to and rotatable with the shaft 14. The rotor assembly comprises a first magnetic claw pole member 40 which is directly attached to the rotatable shaft 14 and includes a radially outwardly extending portion 41 which terminates in axially extending magnetic material fingers 42 that extend into the cylindrical radial gap 24 formed between the stator and field assemblies. The rotor assembly also includes a magnetic pole extension member 45 having fingers 43 which axially extend into the radial gap 24 and are circumferentially interweaved with, but separated from, the first claw pole magnetic fingers 42. The magnetic fingers 42 and 43 are secure to each other by a non-magnetic ring 44 which is also part of the rotor assembly and is coupled to the fingers 42 and 43 by mounting bolts. The pole extension magnetic fingers 43 are magnetically joined together and extend from the generally cylindrically shaped pole extension member 45 which is axially positioned away from and beyond the effective length and the end 33 of the field coil 25.

It should be noted that the field coil 25 and the stator coil 18 have their effective axial lengths positioned in substantially the same axial positions with respect to the shaft axis 20. Also it should be noted that the magnetic field core 26 not only has a larger outer diameter axial extension 34 beyond the field coil end 32 and reduced diameter core section 30, but the core 26 also has a larger outer diameter axial extension 35 positioned beyond the field coil end 33 and reduced diameter core section 30. This axial extension 35 is adjacent to and forms a low reluctance radial flux air gap with the pole extension magnetic member 45.

The operation of the primary embodiment of the alternator 10 illustrated in FIGS. 1 and 2 will now be discussed in detail with regard to the magnetic circuit created for the field coil flux, and how this magnetic circuit results in improved alternator performance by more efficient utilization of the alternator volume.

When D.C. (battery) excitation potential is applied to the input leads 31 of the field coil 25, this results in setting up a zone magnetic flux in the field core 26 which is concentrated in the core 26 along the reduced diameter section 30. This zone of concentrated magnetic flux corresponds to the effective axial electrical length of the field coil 25. The magnetic flux attempts to circulate about the field coil 25 wherein this magnetic flux will seek the lowest reluctance path about the field coil 25 to set up a continuous flux path. Essentially the flux passes from the field core 26, to the rotating fingers 42, to the stator core 19 and back through the pole extension rotating fingers 43 to the field core 26. During this path two primary and two secondary flux air gaps are traversed. The varying magnetic coupling provided by the rotating of the fingers 42 and 43 results in varying the flux in the stator core 19 which creates an output current in the stator coil.

Essentially, substantially all of the field coil flux will pass through two primary radial flux air gaps 50 and 51 formed between the first claw pole extending fingers 42 and the stator core 19, and the pole extension fingers 43 and the stator core 19, respectively. In addition, substantially all of the field coil flux will also pass across a secondary radial flux air gap 52 provided between the axial extension 35 of the field core 26 and the member 45 from which the pole extension fingers 43 extend. It should be noted that the secondary flux gap 52 is radial and is axially positioned beyond the effective axial length of the field coil 25 and the end 33 of the coil 25.

In addition to the above recited flux paths, the field coil flux passes from the field core 26 into the claw pole member 40. This is accomplished, in accordance with the present invention, by providing an axial flux air gap 53 between the axial extension 34 (the end surface 34A) of the field core 26 and the radially extending portion 41 of the claw pole member 40. The axial flux gap 53 provides a low reluctance path for the field coil flux to pass from the field core 26 to the rotating magnetic fingers 42 for subsequent transmission across the primary flux gap 50 to the stator core 19. By providing this low reluctance axial flux gap 53 at an axial location beyond the effective axial length of the coil 25 and beyond the end 32 of the field coil 25, the present invention prevents requiring any substantial reduction in the thickness in the field core portion 30 upon which the field coil 25 is directly wound. This results in providing more volume for the critical field core portion 30 that in turn translates into providing a greater flux carrying capacity for the field core without encountering saturation of the core 26.

Additionally, the present invention provides a substantial amount of surface area for minimizing the reluctance of the flux air gap 53 without any substantial increase in alternator volume by utilizing the radial dimensions of the members 34 and 41 to form this secondary flux carrying axial air gap. In prior brushless alternators, while an axial air gap may have existed in a similar location, this air gap was not utilized for its flux carrying capability since no appreciable field coil flux passed across this air gap. This is contrasted with the present invention wherein it is contemplated that a substantial (at least 25%) proportion of the total field coil flux will pass across an axial flux air gap corresponding to the gap 53.

It should be noted that in the preferred embodiment shown in FIG. 2, two additional secondary flux air gaps are provided between the claw pole member 40 and the field core 26. This occurs due to the claw pole member 40 including a magnetic material step portion 46 which is adjacent to the rotatable shaft 14 and axially extends inward toward the field coil 25 so as to partially overlap the effective axial length of the field coil. The axially extending claw pole magnetic step 46 forms both an additional axial secondary flux air gap 54 and an additional radial secondary flux air gap 55 with a corresponding step portion 58 of the field core 26. The reason for this feature of the present invention is to add mechanical stability to the rotor assembly by increasing the dimension of the claw pole member 40 at its connection point to the rotatable shaft 14. It should be noted that this is accomplished without any substantial reduction in the volume (thickness) of the field core portion 30 on which the field coil 25 is wound wherein any substantial reduction in this portion of the field core would result in the reduced diameter portion being saturated at a lower field coil ampere turns, thereby limiting the output of the alternator. Saturation of the field core 26 is avoided because a majority of the axial length of the section 30 is still directly adjacent to the shaft 14, since the overlap is only partial, such that a substantial thickness of the core 26 is still provided along the majority of the effective axial length of the field coil.

It should also be noted that even though the addition flux air gaps 54 and 55 are provided, it is still contemplated that a substantial (at least 25%) portion of the field coil flux passes through the axially spaced axial flux air gap 53 thus utilizing the low reluctance flux air gap formed by the radially extending surfaces of the members 34 and 41 which face each other. Therefore, the present invention advantageously utilizes the configuration of these members to provide a low reluctance axial flux air gap in a brushless alternator while substantially preventing saturation of the field coil core 26. In fact very little flux should be expected to cross the gap 55 because of its orientation, while a larger amount of flux would be expected across gap 54, but wherein the axial orientation of this gap and gap 53 means that the existing radial dimensions of the field core 26 and the radial portion 41 of the claw pole member 40 are used to provide low reluctance flux paths without any substantial increase in alternator volume.

To better illustrate the field coil flux path occurring in the invention embodiment shown in FIG. 2, a typical flux path is indicated in the lower portion of this figure by the reference arrows 60 wherein this flux path passes through all of the flux air gaps 50 through 52 with a major portion of the field coil flux passing through the flux air gap 53 and minor portions of field coil flux passing through the flux air gaps 54 and 55. As shown in FIG. 2, the field core 26 has an end, which includes the end extension or portion 34, which extends radially with respect to the shaft axis 20 and forms one radially extending end surface of the field core 26. This entire radially extending end surface as shown in FIG. 2 includes the end surface 34A and the end surface (not identified) of the field core 26 which forms airgap 54. This entire radially extending end surface is positioned directly adjacent to the radial extension portion 41 of the first claw pole member 40 which extends from the shaft 14 to formthe low reluctance axial flux air gaps 53 and 54 along substantially all of the entire radially extending end surface.

Figure 3:
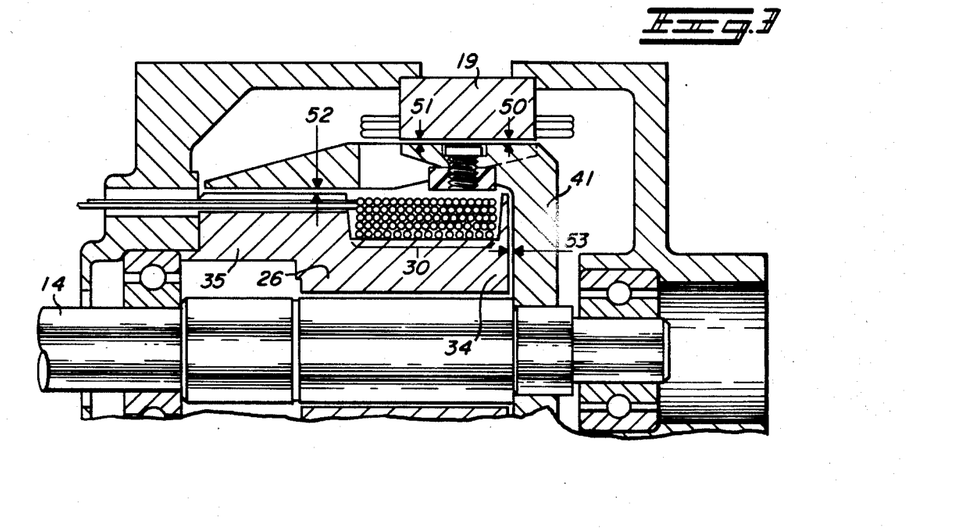
FIGS. 3, 4, 5 and 6 cross sectional views showing various alternative embodiments for the alternator illustrated in FIGS. 1 and 2.

FIG. 3 illustrates an alternate embodiment for the alternator 10 shown in FIGS. 1 and 2. In this alternate embodiment the flux gaps 54 and 55 have been eliminated by essentially extending the axial flux gap 53 and eliminating the axially extending step portion 46 of the claw pole member 40. In some situations this design may be preferable to the design in FIG. 2 if the mass of the rotor assembly can be adequately supported by the non-axially extended portion of the radially extending claw pole member 41 that is attached to the shaft 14. Additionally, this configuration also completely eliminates any reduction in the effective volume in the field core section 30 upon which the field coil 25 is directly wound, thereby further reducing the possibility that this critical section of the field core will become saturated and thereby limit the output of the alternator.

Figure 4:
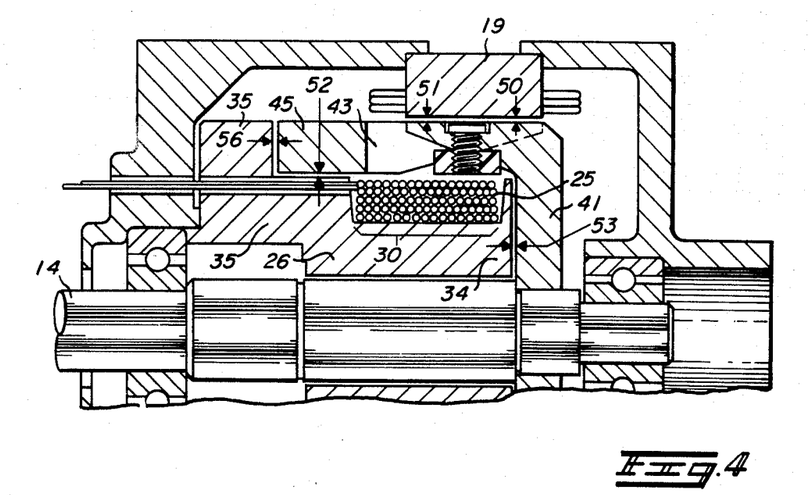

FIG. 4 represents an additional alternate embodiment of the alternator 10 wherein in addition to doing away with the step portion 46 of the claw pole member 40, as per the embodiment shown in FIG. 3, now an additional secondary axial flux air gap 56 is provided adjacent the radial flux air gap 52, wherein both of these flux air gaps are provided between the member 45, the axial extensions of which form the additional magnetic fingers 43, and the field core 26. For the embodiment in FIG. 4, it should be noted that the combined flux air gaps 52 and 56 should provide less reluctance between the members 35 and 45 through the use of more surface area for the same approximate volume of space within the alternator 10. Additionally, by shortening the combined axial extension of the claw pole fingers 42, the additional fingers 43 and the end member 45, more stability is provided for the rotor assembly by providing less rotating mass and this enables a smaller radial dimension to be provided for the air gap 52 thus reducing the reluctance of this flux air gap.

Figure 5:
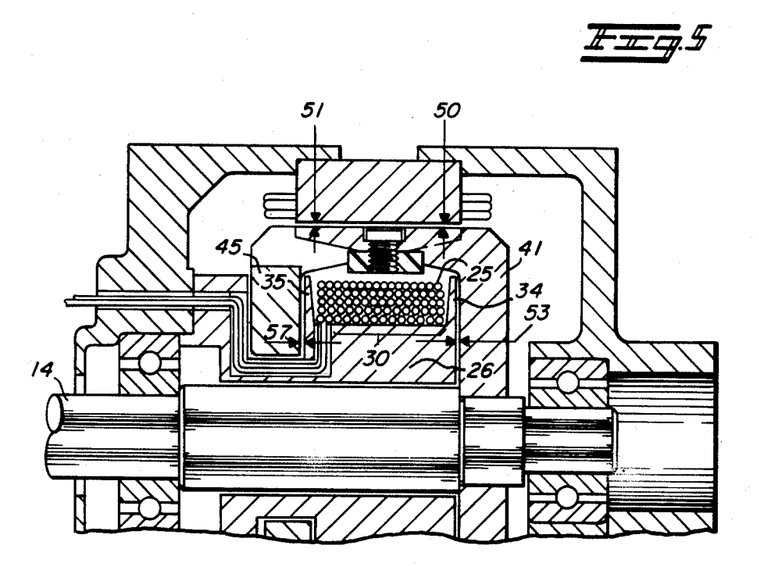

FIG. 5 illustrates an additional alternative embodiment for the alternator 10 wherein now two secondary axial air gaps are provided, one on each side of the field coil 25. Essentially, the configuration in FIG. 5 is substantially similar to that shown in FIG. 3, since the configurations of the air gaps 50, 51 and 53 are maintained, but now the pole extension magnetic material member 45, which joins together the pole extension magnetic fingers 43, radially extends inward toward the shaft 14 and beyond the radial position of said field coil 25 to form a secondary axial flux air gap 57 with the field core 26 at said axially extending portion 35 of the core 26, while the opposite axially extending portion 34 of the core 26 forms the secondary axial flux air gap 53 with the radially extending portion 41 of the first claw pole member 40. For this configuration it should be noted that both secondary flux air gaps are axial and are positioned axially beyond the effective axial length of the field coil 25 and at opposite ends of the coil 25. This configuration, reduces the total axial length required of the alternator, but may limit the alternator output capability.

Figure 6:
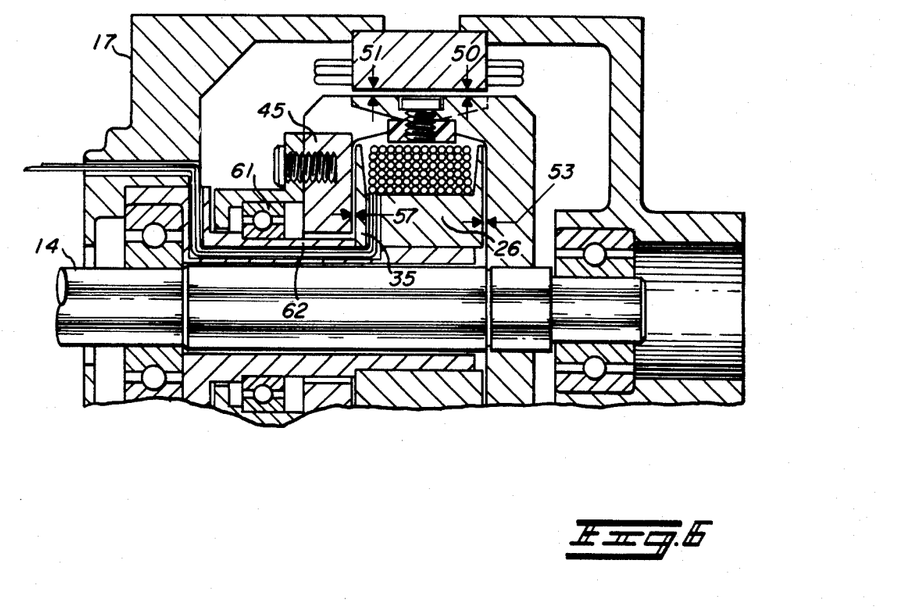

FIG. 6 illustrates an alternate embodiment of the present invention in which the configuration in FIG. 5 is altered to provide additional support for the now radially inwardly extending member 45 by providing a support bearing 61 which mechanically couples the radially inwardly extending magnetic material member 45 to a further axial extension 62 extending from the extension 35 of the field core 26. It should be noted that in the embodiment shown in FIG. 6, the axial extension 62 of the field core comprises a non-magnetic cylindrical sleeve which is coupled to the field core 26 and the housing wall 17 while being radially spaced away from the rotatable shaft 14. This configuration utilizes the two axial secondary flux air gap principle of the embodiment shown in FIG. 5, but provides additional mechanical support for the rotor assembly.

While we have shown and described specific embodiments of the present invention, further modifications and improvements will occur to those of skill in the art. Such modifications could comprise providing the axial flux air gap with respect to the stator core instead of the field core and/or switching the relative inner and outer positions of the stator and field assemblies with respect to the rotatable shaft. All such modifications which retain the basic underlying principles disclosed and claimed herein are within the scope of this invention.

We claim:

1. An alternating current generator comprising:
    an alternator outer housing;
    a rotatable shaft having a longitudinal axis, said shaft extending longitudinally within said housing and rotatable with respect to said housing aout said axis;
    a stator assembly having a magnetic stator core with a stator coil wound thereon defining an effective axial stator coil length along said shaft axis, said stator core being located within and fixed with respect to said housing;
    a field assembly having a magnetic fluid core with a field coil wound thereon defining an effective axial field coil length along said shaft axis, said field core being located within and fixed with respect to said housing;
    said stator coil and core radially spaced apart from said field coil and core with respect to said shaft axis thereby defining a cylindrical radial air gap therebetween;
    at least one of said stator and field magnetic cores having a core end portion axially extending beyond the effective length of the coil wound thereon;
    a rotor assembly fixed to and rotatable with said shaft and including at least a first magnetic claw pole member fixed to said shaft and having magnetic fingers extending into said cylindrical radial gap and forming a low reluctance radial flux air gap between said claw pole member fingers and at least one of said stator and field magnetic cores;
    wherein the improvement comprises,
    said first magnetic claw pole member having magnetic portions that radially extend with respect to said shaft axis and form a low reluctance axial flux air gap with a radially extending end surface of said axially extending core end portion at a position axially beyond the effective axial length of the coil wound on the core having said axially extending core end portion, wherein said axial flux air gap provides a low reluctance magnetic path for conducting a substnatial portion of flux created by said field coil in said field core, wherein said field coil and field magnetic core are radially spaced apart from said shaft with said stator coil and stator magnetic core being further radially spaced apart from said shaft, and wherein said field coil has two opposite effective ends with said effective axial length of said coil defined therebetween, and wherein said field core is generally cylindrical in shape and is positioned about said rotatable shaft with said shaft being substantially non-flux conductive with respect to field coil flux and being positioned directly adjacent to said field core along a majority of the effective axial length of said field coil, said one core having an end, which includes said core end portion, that extends radially with respect to said shaft axis and forms one entire radially extending end surface of said one core which is positioned directly adjacent to radial extension portions of said first claw pole member which extend from said shaft to form a low reluctance axial flux air gap along substantially all of said entire radially extending end surface.

2. An alternating current generator according to claim 1 wherein said rotor assembly includes pole extension magnetic fingers axially extending and circumferentially interweaved with, but spaced apart from, said first magnetic claw pole member magnetic fingers and being secured thereto by a non-magnetic ring.

3. An alternating current generator according to claim 2 wherein said field coil and said stator coil are positioned in substantially the same axial position with respect to said shaft axis.

4. An alternating current generator according to claim 3 wherein said field core axially extends beyond the effective length and both effective ends of said field coil with one of these axial extensions corresponding to said axially extending core end portion which forms said low reluctance axial flux air gap.

5. An alternating current generator according to claim 4 wherein each of said axial extensions of said field core beyond the effective length of said field coil is utilized to provide an axial flux air gap with respect to said rotor assembly with each gap being generally located beyond the effective axial length of said field coil.

6. An alternating current generator according to claim 5 wherein said pole extension magnetic fingers of said rotor assembly are mechanically and magnetically joined together and effectively extend from a pole extension magnetic material member which has a portion radially extending inward toward said shaft and beyond said field coil to form a substantial flux carrying axial flux air gap with said field core at one of said axial extensions of said field core.

7. An alternating current generator according to claim 6 wherein said radially extending portion of said pole extension magnetic material member of said rotor assembly is mechanically coupled by a bearing to a further extension of said field core.

8. An alternating current generator according to claim 4 wherein an axial extension of said field core beyond the effective length of said field coil and opposite to the axial extension of said field core forming said low reluctance axial flux air gap forms a low reluctance radial flux air gap with said pole extension fingers, this radial gap conducting a substantial portion of flux created by said field coil.

9. An alternating current generator according to claim 8 wherein said low reluctance radial flux air gap between said pole extension fingers and said axial extension of said field core is adjacent a low reluctance axial flux air gap between said pole extension fingers and said axial extension of said field core.

10. An alternating current generator according to claim 4 wherein said first magnetic claw pole member includes a magnetic material step portion adjacent said rotatable shaft and axially extending inward toward said field coil so as to partially overlap the effective axial length of said field coil, said claw pole magnetic step portion forming both axial and radial flux air gaps with a corresponding step portion of said field core.

11. An alternating current generator according to claim 1 wherein said rotatable shaft is supported at one end by a bearing in a wall of said housing, wherein said field core is affixed to said wall, and wherein said field core has a cylindrical recess adjacent said bearing and said rotatable shaft and axially positioned beyond the effective axial length of the field coil, said recess storing bearing grease and thereby serving as a cylindrical grease reservoir for said bearing.

12. An alternating current generator according to claim 4 wherein said rotatable shaft is supported at one end by a bearing in a wall of said housing, wherein said field core is affixed to said wall, and wherein said field core has a cylindrical recess adjacent said bearing and said rotatable shaft and axially positioned beyond the effective axial length of the field coil, said recess storing bearing grease and thereby serving as a cylindrical grease reservoir for said bearing.

13. An alternating current generator according to claim 1 wherein said field core is generally cylindrical in shape and is oriented with its longitudinal axis coincident with said shaft axis, and wherein said field core has a bobbin configuration with a reduced outer diameter section on which said field coil is wound axially positioned between larger outer diameter portions of said field core.

14. An alternator current generator comprising:
an alternator outer housing;
a rotatable shaft having a longitudinal axis, said shaft extending longitudinally within said housing and rotatable with respect to said housing about said axis;
a stator assembly having a magnetic stator core with a stator coil wound thereon defining an effective axial stator coil length along said shaft axis, said stator core being located within and fixed with respect to said housing;
a field assembly having a magnetic field core with a field coil wound thereon defining an effective axial field coil length along said shaft axis, said field core being located within and fixed with respect to said housing;
said stator coil and core radially spaced apart from said field coil and core with respect to said shaft axis thereby defining a cylindrical radial air gap therebetween;
at least one of said stator and field magnetic cores having a core end portion axially extending beyond the effective length of the coil wound thereon;
a rotor assembly fixed to and rotatable with said shaft and including at least a first magnetic claw pole member fixed to said shaft and having magnetic fingers extending into said cylindrical radial gap and forming a low reluctance radial flux air gap between said claw pole member fingers and at least one of said stator and field magnetic cores;
wherein the improvement comprises,
said first magnetic claw pole member having magnetic portions that radially extend with respect to said shaft axis and form a low reluctance axial flux air gap with a radially extending end surface of said axially extending core end portion at a position axially beyond the effective axial length of the coil wound on the core having said axially extending core end portion, wherein said axial flux air gap provides a low reluctance magnetic path for conducting a substnatial portion of flux created by said field coil in said field core, and
wherein said rotor assembly includes pole extension magnetic fingers axially extending and circumferentially interweaved with, but spaced apart from, said first claw pole member magnetic fingers and being secured thereto by a non-magnetic coupling apparatus, said pole extension magnetic fingers being support solely by virtue of their connection to said first claw pole member magnetic fingers by said non-magnetic coupling apparatus, wherein said field coil and field magnetic core are radially spaced apart from said shaft with said stator coil and stator magnetic core being further radially spaced apart from said shaft, and wherein said field coil has two opposite effective ends with said effective axial length of said coil defined therebetween, and wherein said field core is generally cylindrical in shape and is positioned about said rotatable shaft with said shaft being substantially non-flux conductive with respect to field coil flux and being positioned direct adjacent to said field core along a majority of the effective axial length of said field coil, said one core having an end, which includes said core end portion, that extends radially with respect to said shaft axis and forms one entire radially extending end surface of said one core which is positioned directly adjacent to radial extension portions of said first magnetic claw pole member which extend from said shaft to form a low reluctance axial flux air gap along substantially all of said entire radially extending end surface.

15. An alternating current generator according to claim 14 wherein said field coil and said stator coil are positioned in substantially the same axial position with respect to said shaft axis.

16. An alternating current generator according to claim 15 wherein said field core axially extends beyond the effective length and both effective ends of said field coil with one of these axial extensions corresponding to said axially extending core end portion which forms said low reluctance axial flux air gap.

17. An alternating current generator according to claim 16 wherein each of said axial extensions of said field core beyond the effective length of said field coil is utilized to provide an axial flux air gap with respect to said rotor assembly with each gap being generally located beyond the effective axial length of said field coil.

18. An alternating current generator according to claim 17 wherein said pole extension magnetic fingers of said rotor assembly are mechanically and magnetically joined together and effectively extend from a pole extension magnetic material member which has a portion radially extending inward toward said shaft and beyond said field coil to form a substantial flux carrying axial flux air gap with said field core at one of said axial extensions of said field core.

19. An alternating current generator according to claim 16 wherein an axial extension of said field core beyond the effective length of said field coil and opposite to the axial extension of said field core forming said low reluctance axial flux air gap forms a low reluctance radial flux air gap with said pole extension fingers, this radial gap conducting a substantial portion of flux created by said field coil.

20. An alternating current generator according to claim 14 wherein said low reluctance radial flux air gap between said pole extension fingers and said axial extension of said field core is adjacent a low reluctance axial flux air gap between said pole extension fingers and said axial extension of said field core.

21. An alternating current generator according to claim 16 wherein said first magnetic claw pole member includes a magnetic material step portion adjacent said rotatable shaft and axially extending inward toward said field coil so as to partially overlap the effective axial length of said field coil, said calw pole magnetic step portion forming both axial and radial flux air gaps with a corresponding step portion of said field core.

22. An alternating current generator according to claim 14 wherein said rotatable shaft is supported at one end by a bearing in a wall of said housing, wherein said field core is affixed to said wall, and wherein said field core has a cylindrical recess adjacent said bearing and said rotatable shaft and axially positioned beyond the effective axial length of the field coil, said recess storing bearing grease and thereby serving as a cylindrical grease reservoir for said bearing.

23. An alternating current generator according to claim 16 wherein said rotatable shaft is supported at one end by a bearing in a wall of said housing, wherein said field core is affixed to said wall, and wherein said field core has a cylindrical recess adjacent said bearing and said rotatable shaft and axially positioned beyond the effective axial length of the field coil, said recess storing bearing grease and thereby serving as a cylindrical grease reservoir for said bearing.

24. An alternating current generator according to claim 14 wherein said field core is generally cylindrical in shape and is oriented with its longitudinal axis coincident with said shaft axis, and wherein said field core has a bobbin configuration with a reduced outer diameter section on which said field coil is wound axially positioned between larger outer diameter portions of said field core.

* * * * *

UNITED STATES PATENT AND TRADEMARK OFFICE
CERTIFICATE OF CORRECTION

PATENT NO. : 4,611,139
DATED : September 9, 1986
INVENTOR(S) : Mikhail Godkin and Kevin Shawn Moran It is certified that error appears in the above—identified patent and that said Letters Patent is hereby corrected as shown below:

Col. 11, line 49, "fluid" should be --field--.

Col. 12, line 10, "substnatial" should be --substantial--.

Col. 14, line 21, "substnatial" should be --substantial--.

Col. 14, line 29, "support" should be --supported--.

Signed and Sealed this

Thirteenth Day of January, 1987

Attest:

DONALD J. QUIGG

Attesting Officer

Commissioner of Patents and Trademarks